US009411710B2

(12) United States Patent
Kumar et al.

(10) Patent No.: US 9,411,710 B2
(45) Date of Patent: Aug. 9, 2016

(54) AUTOMATED REGRESSION TEST CASE SELECTOR AND BLACK BOX TEST COVERAGE TOOL FOR PRODUCT TESTING

(71) Applicants: Vivek Kumar, Bangalore (IN); Sahana Shankar, Bangalore (IN)

(72) Inventors: Vivek Kumar, Bangalore (IN); Sahana Shankar, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/672,614

(22) Filed: Mar. 30, 2015

(65) Prior Publication Data

US 2016/0034382 A1      Feb. 4, 2016

(51) Int. Cl.
*G06F 11/36* (2006.01)
*G06F 9/44* (2006.01)

(52) U.S. Cl.
CPC .......... *G06F 11/3676* (2013.01); *G06F 11/368* (2013.01); *G06F 11/3688* (2013.01)

(58) Field of Classification Search
CPC   G06F 11/368; G06F 11/3676; G06F 11/3688
USPC ........................................................ 717/124
See application file for complete search history.

(56) References Cited

U.S. PATENT DOCUMENTS

| 8,151,248 | B1 * | 4/2012 | Butler | G06F 11/368 717/124 |
| 8,185,877 | B1 * | 5/2012 | Colcord | G06F 9/44 717/124 |
| 8,276,123 | B1 * | 9/2012 | Deng | G06F 11/368 714/37 |
| 8,561,036 | B1 * | 10/2013 | Beans | G06F 11/368 717/124 |
| 2009/0254884 | A1 * | 10/2009 | Rama | G06F 8/75 717/124 |

* cited by examiner

*Primary Examiner* — Ryan Coyer
(74) *Attorney, Agent, or Firm* — Robert P. Marley

(57) ABSTRACT

A method for testing a computer application includes identifying components of a version of the application, said components including one or more components that are one of new and modified, generating a keyword matrix of the identified application components. A search is performed in a test script repository with respect to components listed as at least one of the first and second dimensions of the matrix. The keyword matrix is populated with test case identification numbers in the search result. Based on the populated keyword matrix, one or more of (a) gaps in test case coverage for the version of the application, and (b) one or more test cases covering the version of the application are identified.

18 Claims, 3 Drawing Sheets

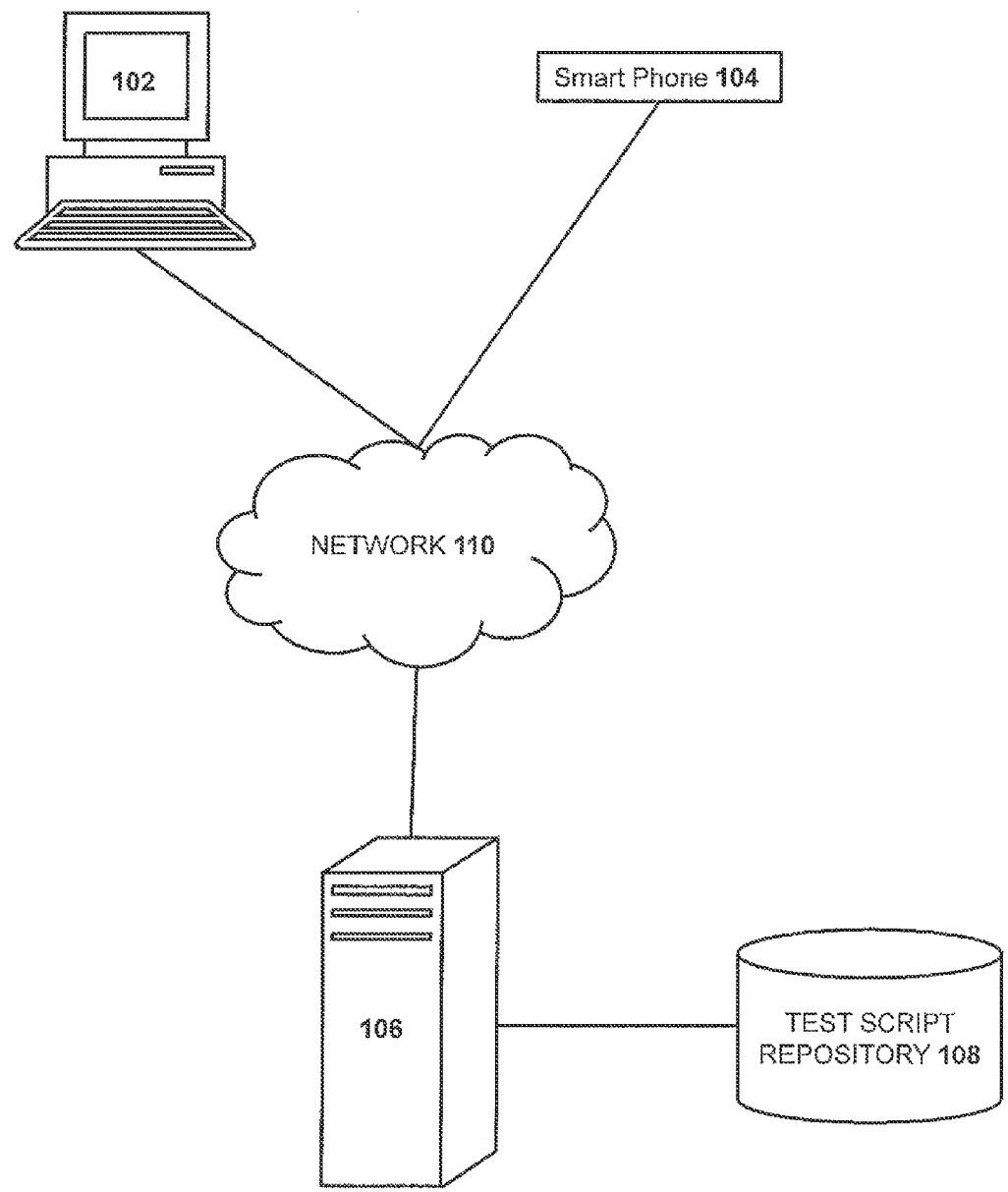

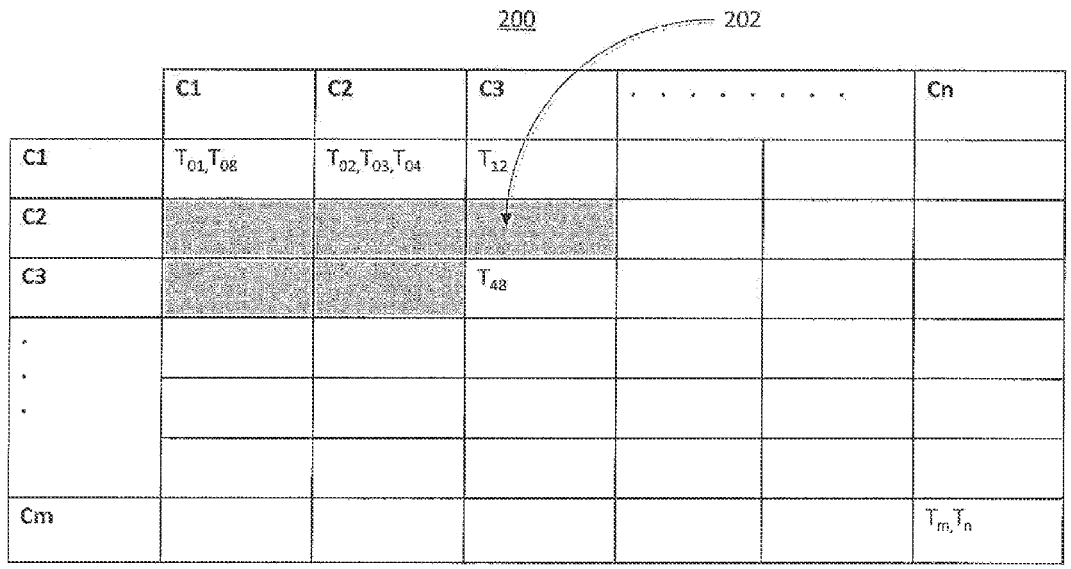

n= fixed total of all product components [Product dependent]
C1,C2....Cn = Components in the product m= components varied in new iterative release [cut/release version dependent]
$T_{01}, T_{02} .... T_m, T_n$ = Test case ID associated with each test case in the test management tool

Shaded Spaces indicate components of the product not represented in the test bed.

"T" is a test case comprising a keyword table (e.g., a set of keywords or components included in a given test script)

FIG. 2

AUTOMATED REGRESSION TEST CASE SELECTOR AND BLACK BOX TEST COVERAGE TOOL FOR PRODUCT TESTING

TECHNICAL FIELD

The field of the invention is generally related to software testing and more particularly to automated test case selection.

BACKGROUND

Software developers often develop software code in, and for, networking environments where the networked systems have diverse operating systems, or "platforms." Software development is often performed incrementally. This means the software code is tested for proper performance as smaller incremental portions are completed, prior to incorporating the smaller portion into the whole. This incremental testing methodology contrasts with waiting to test the entire software application as whole, after completion. Software developers utilize small bits of code, or "scripts," as mechanisms for testing these incremental software portions.

Some testing exercises can be put in simple terms as "breaking the software." In other terms, it is a process to ensure the quality, correctness and completeness of the software under development. One of the most effective testing methodologies used in contemporary software development and testing environments is "Agile" development. Agile follows a dynamic approach to testing software "builds" gradually, in an iterative fashion. Typically, Agile automatically implements continuous testing as a "test driven" development methodology.

In some circumstances, testing requirements are not stable but dynamically fluctuate with the evolving needs of a customer. Customer satisfaction and return on investment (ROI) are directly related to "product quality" and "cost of quality," testing therefore has a critical bearing on the success of any software project. It is the responsibility of software testers and developers to generate a product release having minimal defects. One tool in iterative testing is "regression testing," which is often utilized in each iteration cycle of iterative development effort, such as Agile.

A problem with current regression testing based approaches is that quick and frequent iterations suppress a tester's ability not only to develop and maintain new test scripts, but also complicate identification and selection of every relevant test script from the test bed for execution with respect to the new software release. Because each software release iteration or "version" implies that a new software component is added or an existing software component is modified, a tester must manually re-configure the test scenarios taking care not to miss any test scenarios relating to the new or modified software components.

What is needed is a way to ensure that all the affected components, old and new, along with each of the component "dependencies" are tested thoroughly so that a defect-free product is delivered to the customer.

What is also needed is a way to provide total "black box" test scenario coverage. This is achieved by identifying not only the existing test scripts in the system, but also those missing test scenarios for which test case development is required in order to generate test scripts for all possible underlying component dependencies in a particular release version of the product.

SUMMARY

Embodiments described herein attempt to address the above issues, among others. One aspect identifies relevant test scripts in the script repository to be executed in a particular release version of the product, which removes the need to execute every test script stored in the script repository. Another aspect identifies any missing test scenarios in the existing test scripts in the script repository, which should be added in order to achieve total black box test coverage for the particular release version of the product in the iterative development efforts.

In one embodiment, a method for testing a computer application is provided. The method includes identifying, by a test server, components of a version of the application, said components including one or more components that are one of new and modified, generating, by the test server, a keyword matrix of the identified application components, the keyword matrix having a set of all identified application components as a first dimension and a set of the one or more components that are one of new and modified as a second dimension, performing, by the test server, a search in a test script repository with respect to components listed as at least one of the first and second dimensions, said test script repository including test scripts referencing at least some of the identified components, and determining a result of the search. The method further includes populating, by the test server, the keyword matrix with test case identification numbers in the search result, the test case identification numbers corresponding to test scripts that refer to the at least some of the identified components of the application, and based on the populated keyword matrix, identifying, by the test server, one or more of (a) gaps in test case coverage for the version of the application, and (b) one or more test cases covering the version of the application.

In another embodiment, a system is provided for testing a computer application. The system includes a test script repository including computer readable storage medium having stored thereon computer executable test scripts, as well as a test server coupled to the test script repository. The test server includes a processor executing instructions for testing the computer application, the instructions including identifying components of a version of the application, said components including one or more components that are one of new and modified, generating a keyword matrix of the identified application components, the keyword matrix having a set of all identified application components as a first dimension and a set of the one or more components that are one of new and modified as a second dimension, performing a search in the test script repository with respect to components listed as at least one of the first and second dimensions, said test script repository including test scripts referencing at least some of the identified components, and determining a result of the search, populating the keyword matrix with test case identification numbers in the search result, the test case identification numbers corresponding to test scripts that refer to the at least some of the identified components of the application, and based on the populated keyword matrix, identifying one or more of (a) gaps in test case coverage for the version of the application, and (b) one or more test cases covering the version of the application.

In yet another embodiment, a non-transitory computer readable medium is provided having stored thereon computer executable instructions for testing a computer application. The instructions comprise identifying components of a version of the application, said components including one or more components that are one of new and modified, generating a keyword matrix of the identified application components, the keyword matrix having a set of all identified application components as a first dimension and a set of the one or more components that are one of new and modified as a second dimension, performing a search in a test script repository with respect to components listed as at least one of the first and second dimensions, said test script repository including test scripts referencing at least some of the identified components, and determining a result of the search, populating the keyword matrix with test case identification numbers in the search result, the test case identification numbers corresponding to test scripts that refer to the at least some of the identified components of the application, and based on the populated keyword matrix, identifying one or more of (a) gaps in test case coverage for the version of the application, and (b) one or more test cases covering the version of the application.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 1 is a schematic diagram illustrating an embodiment of a system environment for automatically identifying existing test script inventory and missing test scenarios with respect to a software release of an application, according to an exemplary embodiment.

FIG. 2 is a diagram illustrating an embodiment of a keyword matrix generated by the system of FIG. 1, according to an exemplary embodiment.

DETAILED DESCRIPTION

Figure 3:
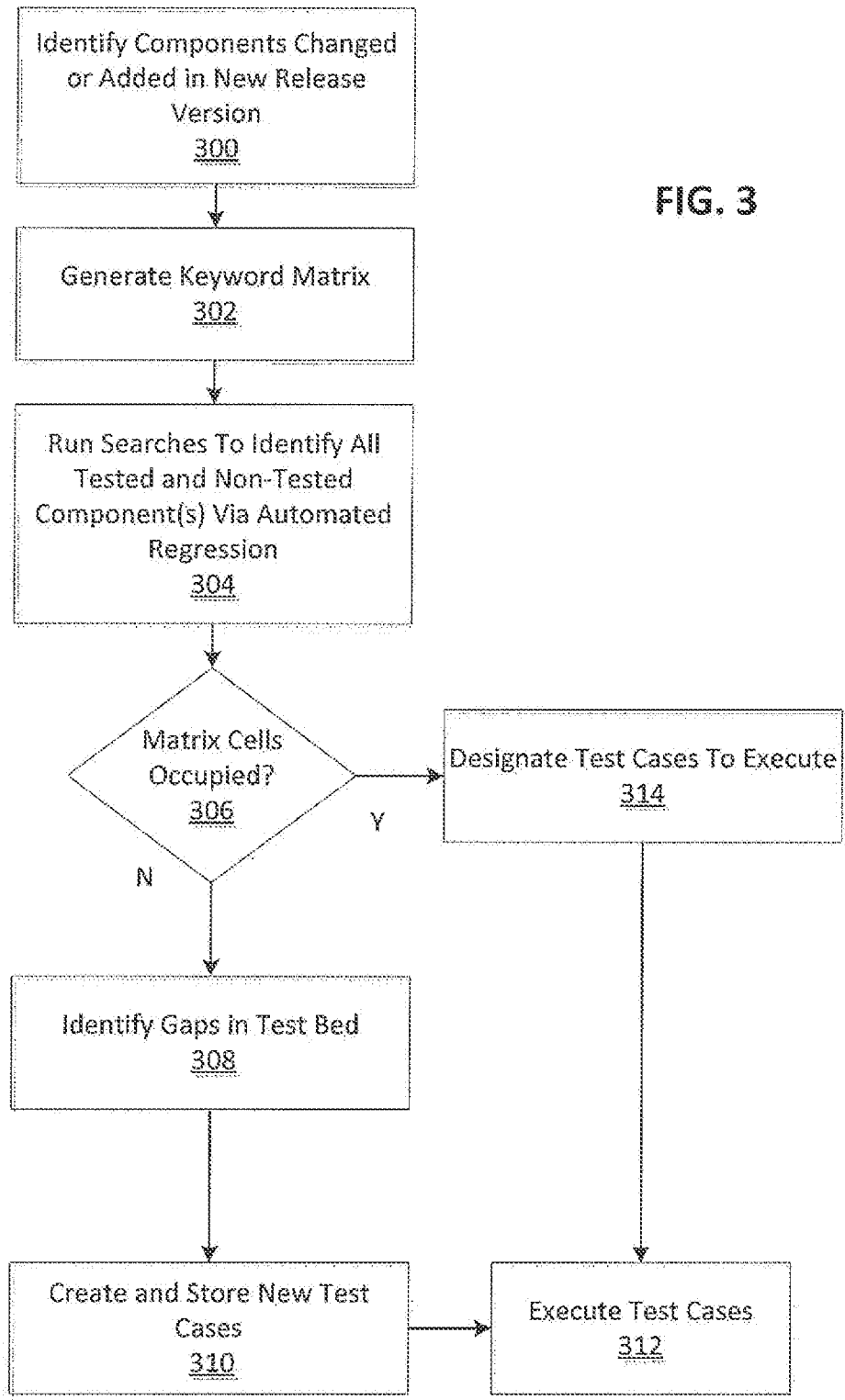
FIG. 3 is a flow chart illustrating an embodiment of a method for automated regression based test case analysis performed by the test server of FIG. 1, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. One skilled in the art recognizes that numerous alternative components and embodiments may be substituted for the particular examples described herein and still fall within the scope of the invention.

It should be appreciated scripts may refer to software development tools, software code, and other machine-readable files prepared to effectively test certain aspects of a larger software development project. Although test scripts are particularly useful in larger object-oriented software development efforts, it should be appreciated that neither the scripts nor the invention are intended to be limited to testing large object-oriented software.

FIG. 1 is a diagram of an embodiment of a system environment 100 showing constituent parts of a system for automatically identifying existing test script inventory and any missing test scenarios with respect to each software release across multiple platforms 102, 104, such as the desktop and mobile platform and respective operating systems. As shown in FIG. 1, a test server 106 communicates with respective client devices 102, 104 as well as with test script repository 108 for executing a plurality of test scenarios that test the functionality of a new software application across the multiple platforms 102, 104. In the illustrated embodiment, the network 110, such as a Local Area Network (LAN) or a Wide Area Network (WAN) including the Internet, links the test server 106, client devices 102, 104 and/or the test script repository 108. The test script repository 108 includes a computer readable storage medium, such as a hard drive, a flash drive, RAM, or other non-transitory storage media, configured to store executable code corresponding to test scripts that test the functionality of software components defined in the software application product subject to testing. The test server 106 causes execution, by a processor, of test scripts, stored in the test script repository 108, that test the functionality of the software components of the application under testing.

As discussed in further detail below, the test server 106 performs an automated regression based test case analysis, whereby it identifies a list of test cases from the script repository 108 that need to be executed for a particular release version of the software under testing or each iteration of agile methodology. This can speed up the testing process by removing the need to execute the entire test bed of test scripts. Instead, only the test cases relevant to a particular release version are executed. Additionally, the test server 106 provides the result in a matrix format thereby indicating those components of the software product that are not being tested by the existing test cases. It takes into account all possible dependencies and interactions between the various components in the software product. This indicates the extent of test coverage of the components in the product that was modified during an iteration of the testing process and identifies any gaps in test scenarios, thereby informing which additional test cases need to be created and executed. The test server 106 also initiates an automatic batch run of identified test cases.

For a given release version, the software product under testing includes a plurality of components, e.g., n total components ranging from $C_1, C_2 \ldots$ through $C_n$. However, the number of software components "C" remains constant only for a particular release version of the product "V" and may for each release. With every release version of the product, a new component may be added, for example as a result of change request or business requirements, which causes the number of components to vary accordingly.

Each test case associated with a corresponding test script in repository 108 has a keyword table containing a set of keywords. Each component "C" in the product is considered to be a keyword. Hence, if the product is made up of components $C_1, C_2, C_3 \ldots C_n$, then the keyword set for the entire software product would likewise be $C_1, C_2, C_3 \ldots C_n$. Similarly, the keyword entries for a given test case in the keyword table are based on the particular components being tested by such test case. For example, if a test case "T" is aimed to verify the components $C_1, C_3$ and $C_5$, the keyword table for this particular test case would consist of 3 keywords $C_1, C_3$ and $C_5$. The keyword table for each test case is dynamic to accommodate more keywords or remove keywords in the future based on test case maintenance and changes to components of the software under testing. In the above described embodiment, the total number of keywords "K" is equal to the number of components "C" in the product. Hence "K=C."

Every test case and corresponding test script in the test script repository 108 is associated with a unique Test Case identification (ID) (e.g., "$T_{01}$," "$T_{02}$," and so on). These IDs are used to populate the entries of a keyword matrix depicted in FIG. 2. In an embodiment, the test server 106 creates a keyword matrix 200 before the start of regression testing. When populated, the keyword matrix identifies: (a) the test cases from the test management tool that need to be executed for a given release of the software under testing, and (b) any missing test scenarios (or the extent of black box coverage). As shown in FIG. 2, all components $C_1$ through $C_n$ of the software/application under testing are listed along the X Axis of the keyword matrix 200. The components $C_1$ through $C_m$ that were changed or newly added due to a new release version of the tested software product are listed along the Y Axis.

The test server 106 performs a plurality of cross-referencing searches that fill in the keyword matrix 200 and thereby identify (a) test cases relevant to a particular version/release of the application under testing, as well as (b) any missing test scenarios with respect to any components or component combinations that are not accounted for in the existing test cases. In particular, after setting up the keyword matrix 200, the test server 106 performs a multiple searches, including a search based on the keyword table associated with each test case, as well as a search from the keyword matrix to the keyword table. The test cases in the test script repository 108 of the test management tool are traced in a linear fashion. The test server 106 performs a keyword based search from the first component of the Y axis of keyword matrix 200 to the keyword table of each test case.

If a match is found from the keyword table to the Y axis of the keyword matrix 200, then a search is performed along the X axis as well including any remaining keywords in the keyword table. For each match found along the X axis and its corresponding Y Axis, the Test Case ID is entered in the particular X-Y cell, as shown in FIG. 2.

If a match is found only along the Y axis and not along the X axis, then Test Case ID entry is made only in the particular Xm-Xn cell, where m=n.

In an embodiment, if a match is not found along the Y axis in the keyword search of the keyword matrix, then search is not performed along the X axis for that keyword. The linear search is moved onto the next case in the test management tool. This is so because the aim of the process described herein is to optimize the test bed that needs to be executed for a particular release version of the product, hence if a match is not found against the Y axis (i.e., with respect to a test case related to a changed component or a new component), then there is no need to execute the test case.

After exercising the entire test bed to complete the keyword matrix, the test server 106 determines vacant spaces in the keyword matrix 200, graphically indicated as shaded spaces 202 in FIG. 2, which indicate those components and/or component combinations of the software product under testing that currently do not have a corresponding test scenario in the test script repository 108. For instance, as shown in FIG. 2, a component combination C2, C3 does not have a corresponding test scenario "T." The missing test scenario information servers as an input for identifying which test scenarios need to be created in light of the component modifications in the new release of the software product under testing. The newly created test scenarios are then stored in the test script repository 108 and forwarded to a test automation tool for execution.

With respect to the existing test cases identified as covering particular components for the software release in question, the corresponding Test Case ID(s) from the keyword matrix are provided by the test server 106 as an input to the automation test tool that automatically invokes their execution.

FIG. 3 illustrates an embodiment of a method for automated regression based test case analysis performed by the test server 106. In steps 300-302, the test server 106 identifies new or added components when a new release version of the software under testing is issued. In step 304, the server 106 executes an automated regression process against the generated keyword matrix, as described above in connection with FIG. 2, which results in identifying all tested and non-tested components of the new software release. In steps 306-308, if the matrix 200 includes unoccupied cells, the test server 106 identifies corresponding components and/or component combinations as gaps in the test repository 106 which require creation of new test cases. In step 310, the newly identified test case scenarios are created and stored as new test scripts in the test script repository 108. In step 312, the newly created test scripts are input to an automated tool for test execution. Additionally, in step 306, 312, test scripts corresponding to test case scenarios in the occupied cells of the keyword matrix of FIG. 2 are forwarded by the test sever 106 for execution.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted by any suitable means including memory sharing, message passing, token passing, network transmission, among others.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for testing a computer application, the method comprising:
   identifying, by a test server, components of a version of the application, said components including one or more components that are one of new and modified, wherein each of the one or more components corresponds to a keyword;
   generating, by the test server, a keyword matrix of the identified application components, the keyword matrix having a set of all identified application components as a first dimension and a set of the one or more components that are one of new and modified as a second dimension, wherein the keyword matrix comprises the keywords;
   performing, by the test server, a search in a test script repository with respect to components listed as at least one of the first and second dimensions, said test script repository including test scripts referencing at least some of the identified components, and determining a result of the search;
   populating, by the test server, the keyword matrix with test case identification numbers in the search result, the test case identification numbers corresponding to test scripts that refer to the at least some of the identified components of the application; and
   based on the populated keyword matrix, identifying, by the test server, one or more of (a) gaps in test case coverage for the version of the application, and (b) one or more test cases covering the version of the application.

2. The method of claim 1 further comprising executing the one or more test cases covering the version of the application.

3. The method of claim 1 further comprising receiving an input of test cases corresponding to the gaps in test coverage for the version of the application.

4. The method of claim 1 wherein each test script comprises a keyword table including a set of the at least some of the identified components of the application.

5. The method of claim 4 wherein the search is based on the keyword table associated with each test script.

6. The method of claim 4 wherein the search is performed from the keyword matrix to the keyword table.

7. A system for testing a computer application, the system comprising:
   a test script repository including computer readable storage medium having stored thereon computer executable test scripts; and
   a test server coupled to the test script repository, the test server including a processor executing instructions for testing the computer application, the instructions including:
      identifying components of a version of the application, said components including one or more components that are one of new and modified, wherein each of the one or more components corresponds to a keyword;
      generating a keyword matrix of the identified application components, the keyword matrix having a set of all identified application components as a first dimension and a set of the one or more components that are one of new and modified as a second dimension, wherein the keyword matrix comprises the keywords;
      performing a search in the test script repository with respect to components listed as at least one of the first and second dimensions, said test script repository including test scripts referencing at least some of the identified components, and determining a result of the search;
      populating the keyword matrix with test case identification numbers in the search result, the test case identification numbers corresponding to test scripts that refer to the at least some of the identified components of the application; and
      based on the populated keyword matrix, identifying one or more of (a) gaps in test case coverage for the version of the application, and (b) one or more test cases covering the version of the application.

8. The system of claim 7 wherein the instructions further comprise executing the one or more test cases covering the version of the application.

9. The system of claim 7 wherein the instructions further comprise receiving an input of test cases corresponding to the gaps in test coverage for the version of the application.

10. The system of claim 7 wherein each test script comprises a keyword table including a set of the at least some of the identified components of the application.

11. The system of claim 10 wherein the search is based on the keyword table associated with each test script.

12. The system of claim 10 wherein the search is performed from the keyword matrix to the keyword table.

13. A non-transitory computer readable medium having stored thereon comp r executable instructions for testing a computer application, the instructions comprising:

identifying components of a version of the application, said components including one or more components that are one of new and modified, wherein each of the one or more components corresponds to a keyword;

generating a keyword matrix of the identified application components, the keyword matrix having a set of all identified application components as a first dimension and a set of the one or more components that are one of new and modified as a second dimension, wherein the keyword matrix comprises the keywords;

performing a search in a test script repository with respect to components listed as at least one of the first and second dimensions, said test script repository including test scripts referencing at least some of the identified components, and determining a result of the search;

populating the keyword matrix with test case identification numbers in the search result, the test case identification numbers corresponding to test scripts that refer to the at least some of the identified components of the application; and based on the populated keyword matrix, identifying one or more of (a) gaps in test case coverage for the version of the application, and (b) one or more test cases covering the version of the application.

14. The computer readable medium of claim 13 wherein the instructions further comprise executing the one or more test cases covering the version of the application.

15. The computer readable medium of claim 13 wherein the instructions further comprise receiving an input of test cases corresponding to the gaps in test coverage for the version of the application.

16. The computer readable medium of claim 13 wherein each test script comprises a keyword table including a set of the at least some of the identified components of the application.

17. The computer readable medium of claim 16 wherein the search is based on the keyword table associated with each test script.

18. The computer readable medium of claim 16 wherein the search is performed from the keyword matrix to the keyword table.

\* \* \* \* \*